(12) United States Patent
Burns et al.

(10) Patent No.: US 10,819,106 B2
(45) Date of Patent: Oct. 27, 2020

(54) ARC QUENCHING DEVICE WITH RACKING DRIVE

(71) Applicant: Eaton Intelligent Power Limited, Dublin (IE)

(72) Inventors: Robert J. Burns, Hendersonville, NC (US); Dan E. Hrncir, Arden, NC (US); David A. Metcalf, Black Mountain, NC (US)

(73) Assignee: Eaton Intelligent Power Limited, Dublin (IE)

( * ) Notice: Subject to any disclaimer, the term of this patent is extended or adjusted under 35 U.S.C. 154(b) by 331 days.

(21) Appl. No.: 16/000,303

(22) Filed: Jun. 5, 2018

(65) Prior Publication Data

US 2019/0372339 A1 Dec. 5, 2019

(51) Int. Cl.
| | | |
|---|---|---|
| *H02H 9/04* | (2006.01) |
| *H02B 3/00* | (2006.01) |
| *H02B 11/127* | (2006.01) |
| *H01T 4/12* | (2006.01) |
| *H01T 2/02* | (2006.01) |
| *H01H 33/53* | (2006.01) |
| *H02B 1/36* | (2006.01) |

(52) U.S. Cl.
CPC ............ *H02H 9/041* (2013.01); *H01H 33/53* (2013.01); *H01T 2/02* (2013.01); *H01T 4/12* (2013.01); *H02B 1/36* (2013.01); *H02B 3/00* (2013.01); *H02B 11/127* (2013.01)

(58) Field of Classification Search
CPC .......... H02H 1/0015; H02H 9/04; H01H 9/00; H01H 9/30; H02B 1/26; H02B 3/00; H02B 11/127; H02B 1/36

USPC ............................................ 361/13, 115, 117
See application file for complete search history.

(56) References Cited

U.S. PATENT DOCUMENTS

| | | | | |
|---|---|---|---|---|
| 8,264,809 B2* | 9/2012 | Robarge | ................... | H01T 1/00 361/115 |
| 8,307,545 B1* | 11/2012 | Ledbetter | ................. | H02B 3/00 200/50.21 |
| 8,390,975 B1* | 3/2013 | Ledbetter | ................. | H02B 3/00 361/115 |

(Continued)

OTHER PUBLICATIONS

*Motarized Remote Racking for Breaker and Auxiliary Compoartments with Breaker Controls*; Motorized Remote Racking (MR2) Metal-clad Switchgear, Eaton, 2 pages, (2017).

*Primary Examiner* — Gary A Nash
(74) *Attorney, Agent, or Firm* — Stanek Lemon Crouse & Meeks, P.A.

(57) ABSTRACT

An arc quenching device includes a frame, at least one controlled-arcing device supported by the frame, and at least one contact assembly supported by the frame and electrically connected to the at least one controlled-arcing device. The device further includes a racking mechanism supported by the frame and including a motor and at least one actuator member driven by the motor and configured to engage a feature in an electrical equipment unit compartment to move the arc quenching device within the compartment and engage the at least one contact assembly with a bus of the electrical equipment unit. The arc quenching device may be configured to be installed in a cassette in the electrical equipment unit and the actuator member may be configured to engage a feature of the cassette.

17 Claims, 11 Drawing Sheets

(56) References Cited

U.S. PATENT DOCUMENTS

| | | | |
|---|---|---|---|
| 2010/0024191 A1* | 2/2010 | Ledbetter | H02B 11/127 29/428 |
| 2011/0216508 A1* | 9/2011 | Faulkner | H02B 11/127 361/724 |
| 2012/0199450 A1* | 8/2012 | Bower | H02B 11/127 200/50.25 |
| 2013/0037394 A1* | 2/2013 | Greer | H02B 3/00 200/50.24 |
| 2015/0295390 A1* | 10/2015 | Pellicano | H02B 1/36 361/624 |
| 2016/0285259 A1 | 9/2016 | Shea et al. | |
| 2017/0149218 A1* | 5/2017 | Miele | H02B 11/127 |

\* cited by examiner

ARC QUENCHING DEVICE WITH RACKING DRIVE

BACKGROUND

The inventive subject matter relates to electrical apparatus and, more particularly, to arc quenching devices.

Electrical safety hazards are often associated with low or medium voltage power applications, such electrical switchgear. For example, arc flash events can cause personnel injury or death and can damage switchgear and surrounding structures. Arc flash events can also lead to significant downtime as failed or damage equipment is being restored or replace.

Arc flash can be caused by various factors, such as maintenance failures, procedural failures, insulation degradation and test equipment failure. Arc flash mitigation devices have been developed to reduce the damage caused by arc flash events. For example, U.S. Patent Application Publication No. 2016/0285259 to Shea describes an arc flash mitigation switch that can be installed in a switchgear unit or other piece of medium voltage equipment and that quenches arc faults by creating a compensatory flash in a contained environment to divert energy from an uncontrolled arc fault elsewhere in the equipment.

SUMMARY OF THE INVENTION

Some embodiments of the inventive subject matter provide an arc quenching device including a frame, at least one controlled-arcing device supported by the frame, and at least one contact assembly supported by the frame and electrically connected to the at least one controlled-arcing device. The device further includes a racking mechanism supported by the frame and including a motor and at least one actuator member driven by the motor and configured to engage a feature in an electrical equipment unit compartment to move the arc quenching device within the compartment and engage the at least one contact assembly with a bus of the electrical equipment unit. The arc quenching device may be configured to be installed in a cassette in the electrical equipment unit and the actuator member may be configured to engage a feature of the cassette.

In some embodiments, the frame may include first and second walls on respective first and second sides of the at least one controlled-arcing device, and the racking mechanism may include an axle extending between the first and second walls of the frame and a motor drive unit including the motor and configured to rotate the axle. The at least one actuator member may extend radially from the axle to engage the feature of the cassette.

In further embodiments, the at least one actuator member may include an arm extending radially from the axle and a pawl at a distal end of the arm and configured to engage a notch in the cassette. The cassette may include a tab extending from a wall of the cassette, and the pawl may be configured to engage a notch in the tab.

In still further embodiments, the motor drive unit may include a worm shaft configured to rotate the axle and a gear box configured to drive the worm shaft via a bevel gear. The motor may be configured to drive the gear box.

In some embodiments, the at least one controlled-arcing device may include first and second vertically-oriented cylindrical controlled-arcing devices. The device may further include a first bus bar connected to a top terminal of the first controlled-arcing device, a second bus bar interconnecting bottom terminals of the first and second controlled-arcing devices, and a third bus bar connected to a top terminal of the second controlled-arcing device. The at least one contact assembly may include first, second and third stab connectors electrically connected to respective ones of the first, second and third bus bars.

Further embodiments may include a motor drive circuit supported by the frame, coupled to the motor and configured to be controlled by a wired or wireless remote control device.

DETAILED DESCRIPTION

Figure 1:
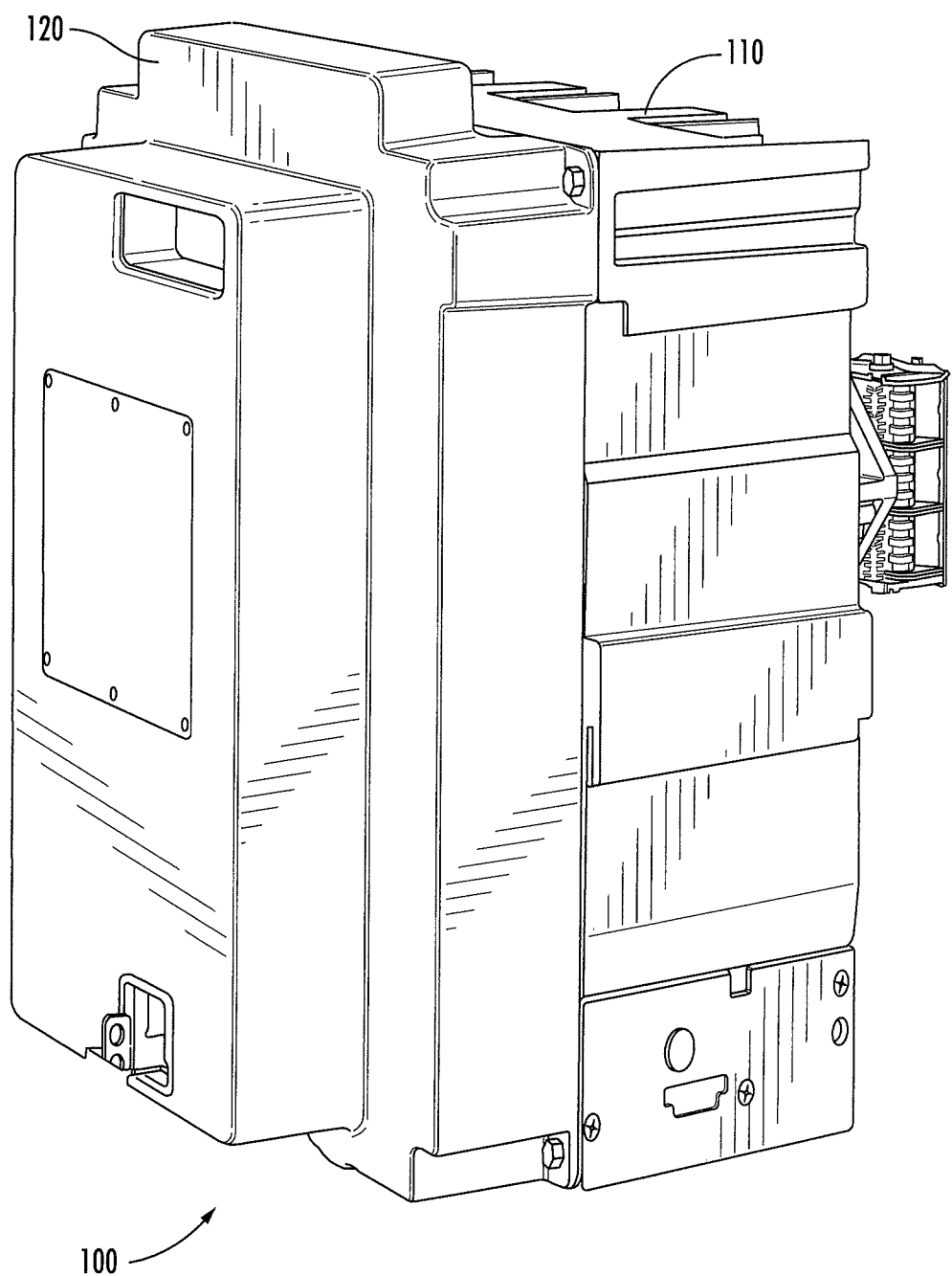
FIG. 1 is a perspective view of an arc-quenching device (AQD) according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates an arc-quenching device (AQD) 100 according to some embodiments of the inventive subject matter. The AQD 100 includes a frame 110, which is configured to mechanically support at least one controlled-arcing device therein, concealed in FIG. 1 by an exterior front cover 120. The frame 110 may be fabricated using, for example, a glass-reinforced polyester resin material that provides structural strength and electrical isolation. As explained in detail below, the frame 110 is The frame 110 and a front cover 120 serve as parts of a housing for the at least one controlled-arcing device and other internal components of the AQD 100.

Figure 2:
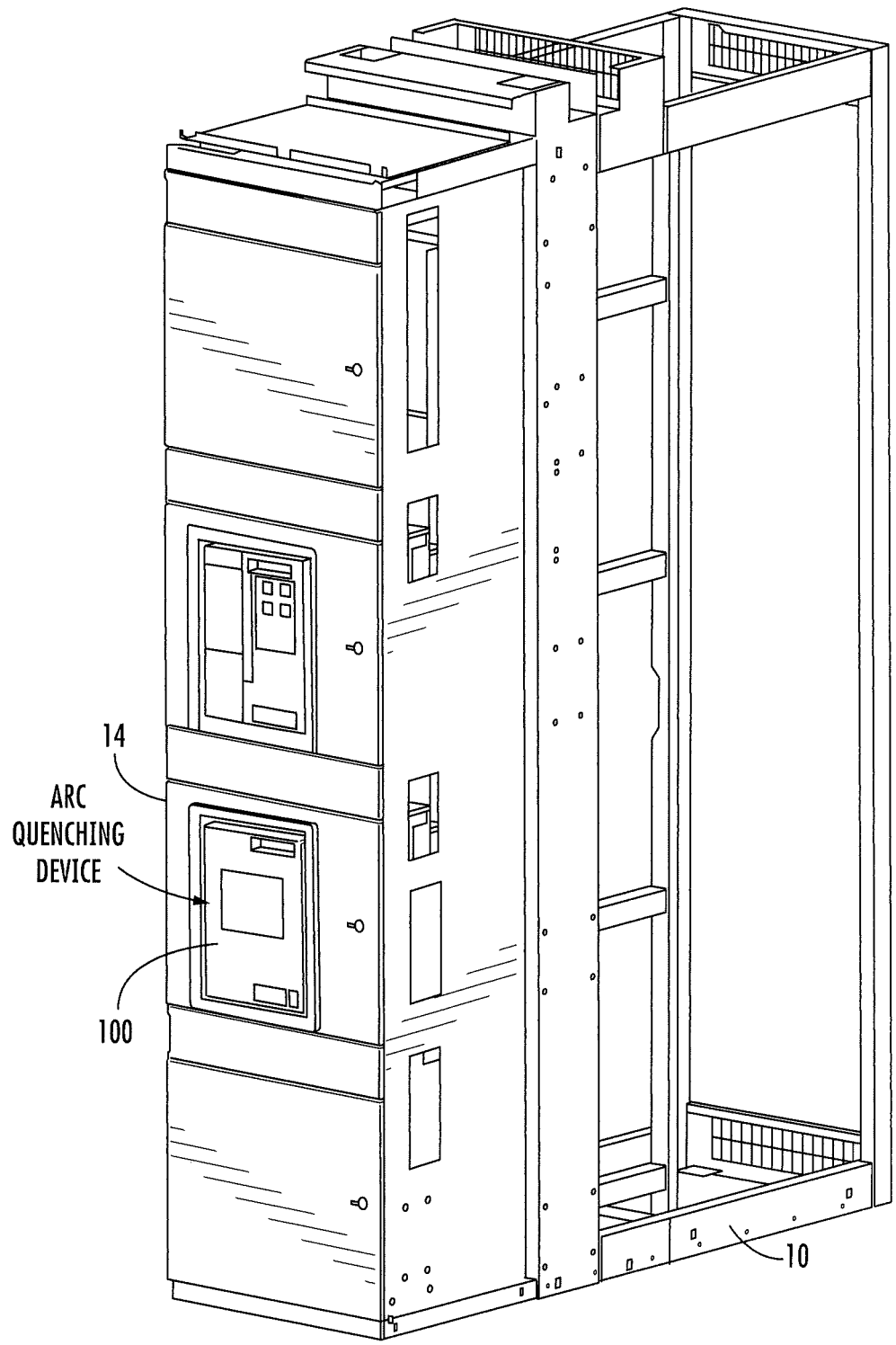
FIGS. 2 and 3 are perspective views of the AQD of FIG. 1 installed in an electrical equipment unit.
Figure 3:
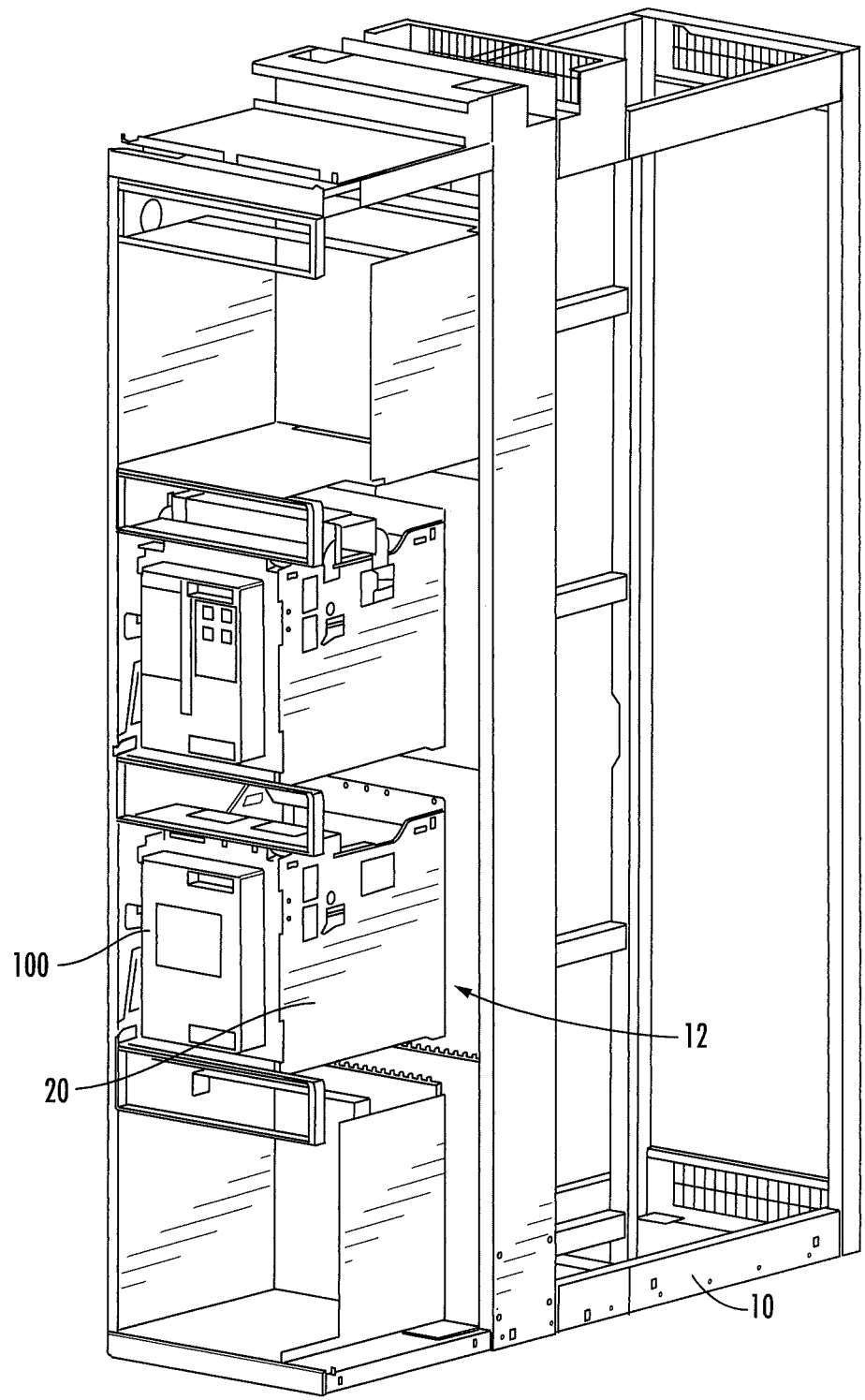

FIGS. 2 and 3 illustrate typical installation of the AQD 100 in an electrical equipment unit 10. In particular, referring to FIG. 3, the AQD 100 is configured to be installed in a cassette 20 within a compartment 12 in the electrical equipment unit 10. As shown in FIG. 2, access to the AQD 100 may be provided by a door 14. According to some embodiments of the inventive subject matter below, an AQD, such as the AQD 100 of FIGS. 1-3, may be provided with an integral motorized racking mechanism that enables remote racking of the AQD within the electrical equipment unit 10 using, for example, a wired or wireless remote control device.

Figure 4:
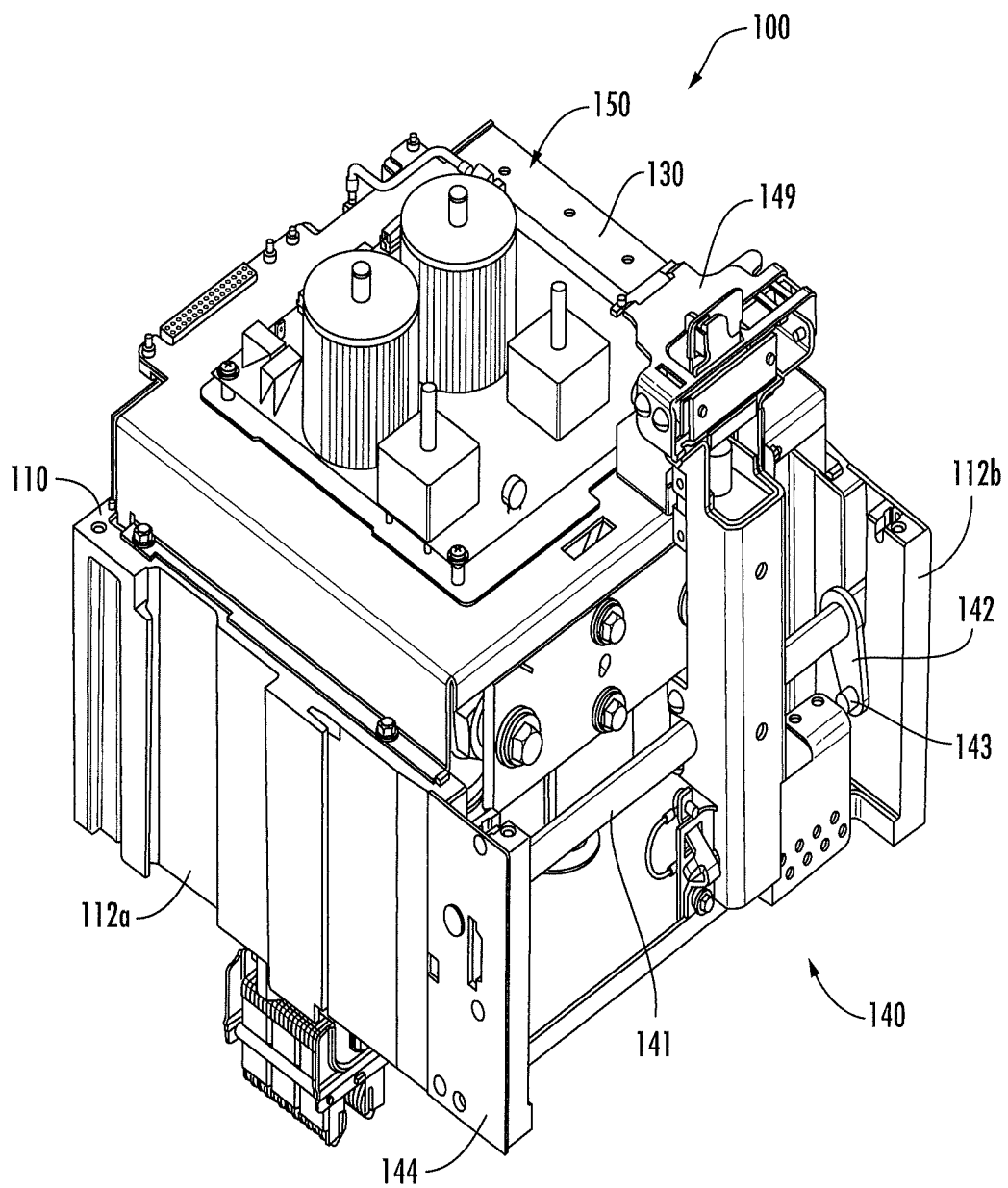
FIG. 4 is a perspective view of the AQD of FIG. 1 with a front exterior cover removed.

FIG. 4 illustrates the AQD 100 of FIGS. 1-3 with the front cover 120 removed and showing portions of a racking mechanism 140. The racking mechanism 140 includes an axle 141 that extends between first and second walls of the frame 110 and through holes in respective metal bearing plates 144 that are affixed to the first and second walls 112a, 112b of the frame 110. It will be appreciated that this bearing arrangement is an example, and that other arrangements may be used, such as ones using journal or roller bearings embedded in the walls 112a, 112b of the frame 110.

The axle 141 is configured to be rotationally driven by a worm drive (see description of FIGS. 5 and 7 below). The axle 141 has at least one actuator member extending radially therefrom which is configured to engage a feature of a cassette in which the AQD 100 is installed. Rotation of the axle 141 causes the actuator mechanism to exert a force against the cassette and cause movement of the AQD 100 with respect to the cassette, as explained in greater detail below. As shown in FIG. 2, each actuator member includes an arm 142 that extends radially from the axle 141 and has a pawl 143 at a distal end thereof which is configured to engage a notched tab in the cassette, as explained below with reference to FIGS. 9-11. An internal cover 130 is affixed to the frame 110 and supports a control board 150 that includes electronic circuitry for driving the racking mechanism 140 and controlling other components of the AQD 100.

Figure 5:
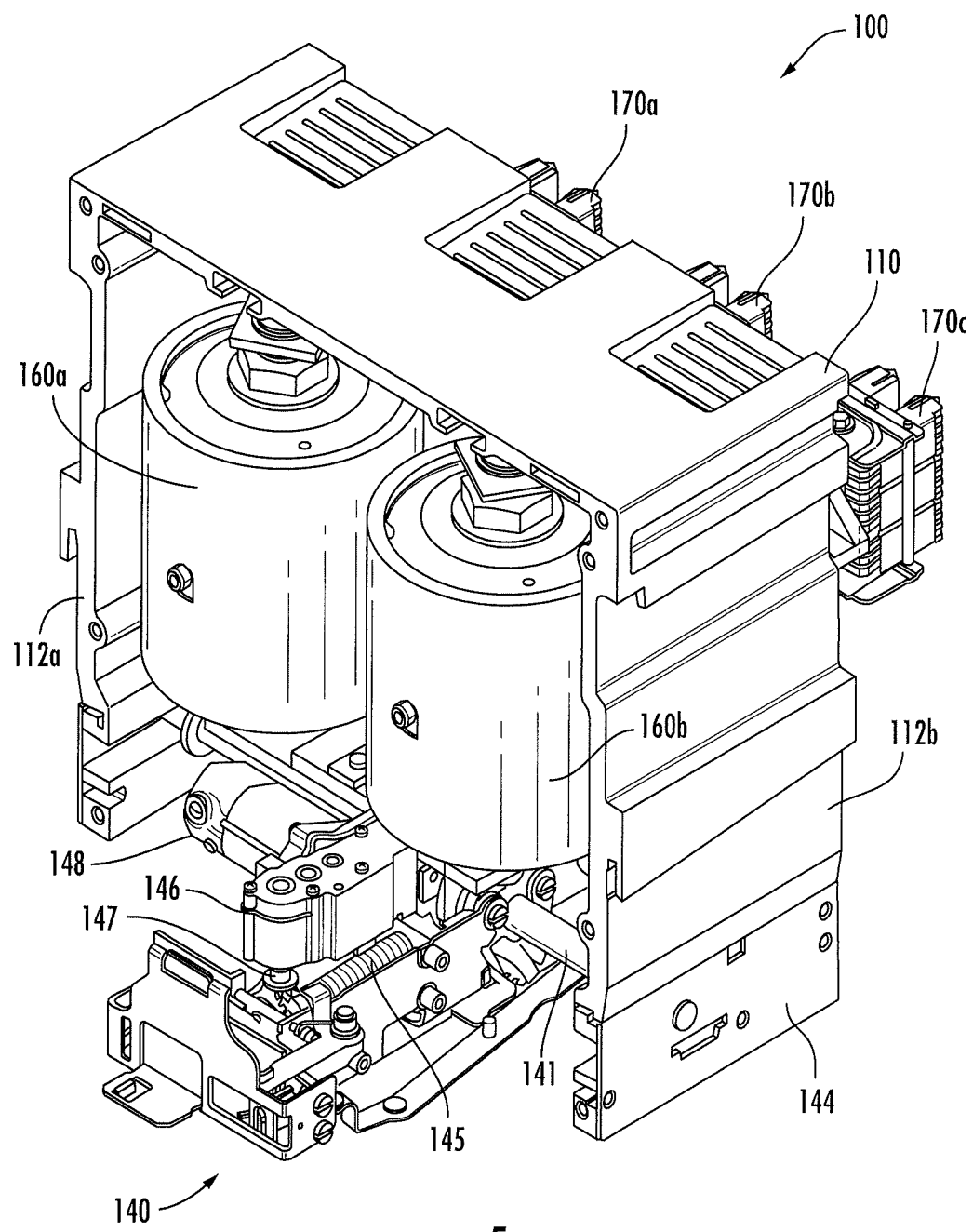
FIG. 5 is a perspective view of the AQD of FIG. 1 with an interior front cover removed.

FIGS. 5-8 are perspective, side, bottom and front views, respectively, of the AQD 100 with the internal cover 130 removed to reveal internal components of the AQD 100. Referring to FIG. 5, first and second controlled-arcing devices 160a, 160b are disposed within a space defined by the frame 110. The controlled-arcing devices 160a, 160b are devices that generate contained arcs that are used to divert energy from uncontained arcs in other locations in an electrical equipment unit in which the AQD 100 is installed, to reduce or prevent injury to personnel and damage to components of the electrical equipment unit. An example of such a controlled-arcing device is described in the aforementioned U.S. Patent Application Publication No. 2016/0285259 to Shea et al., the disclosure of which is incorporated herein by reference in its entirety.

Figure 6:
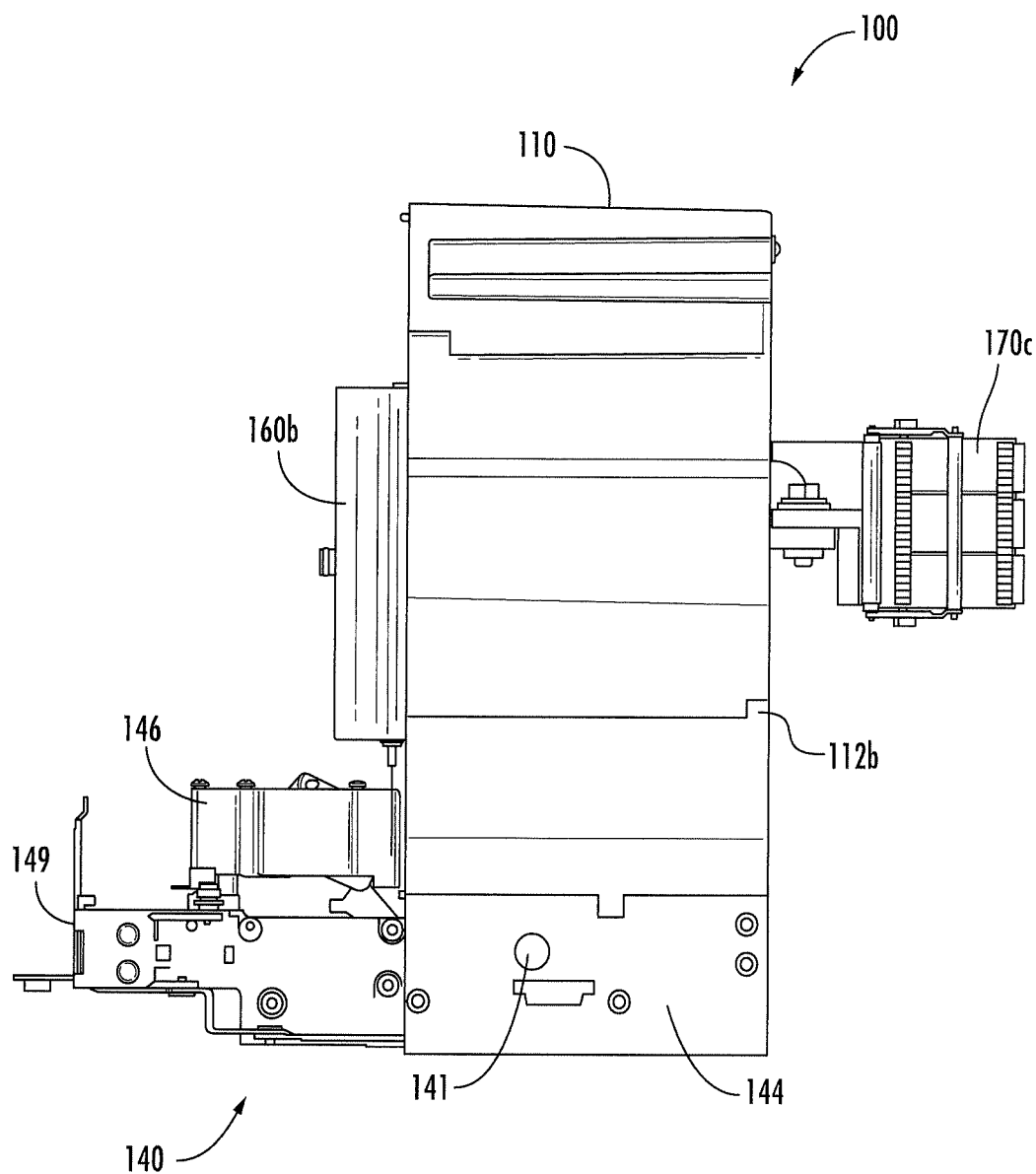
FIG. 6 is a side perspective view of the AQD of FIG. 1 with an interior front cover removed.
Figure 7:
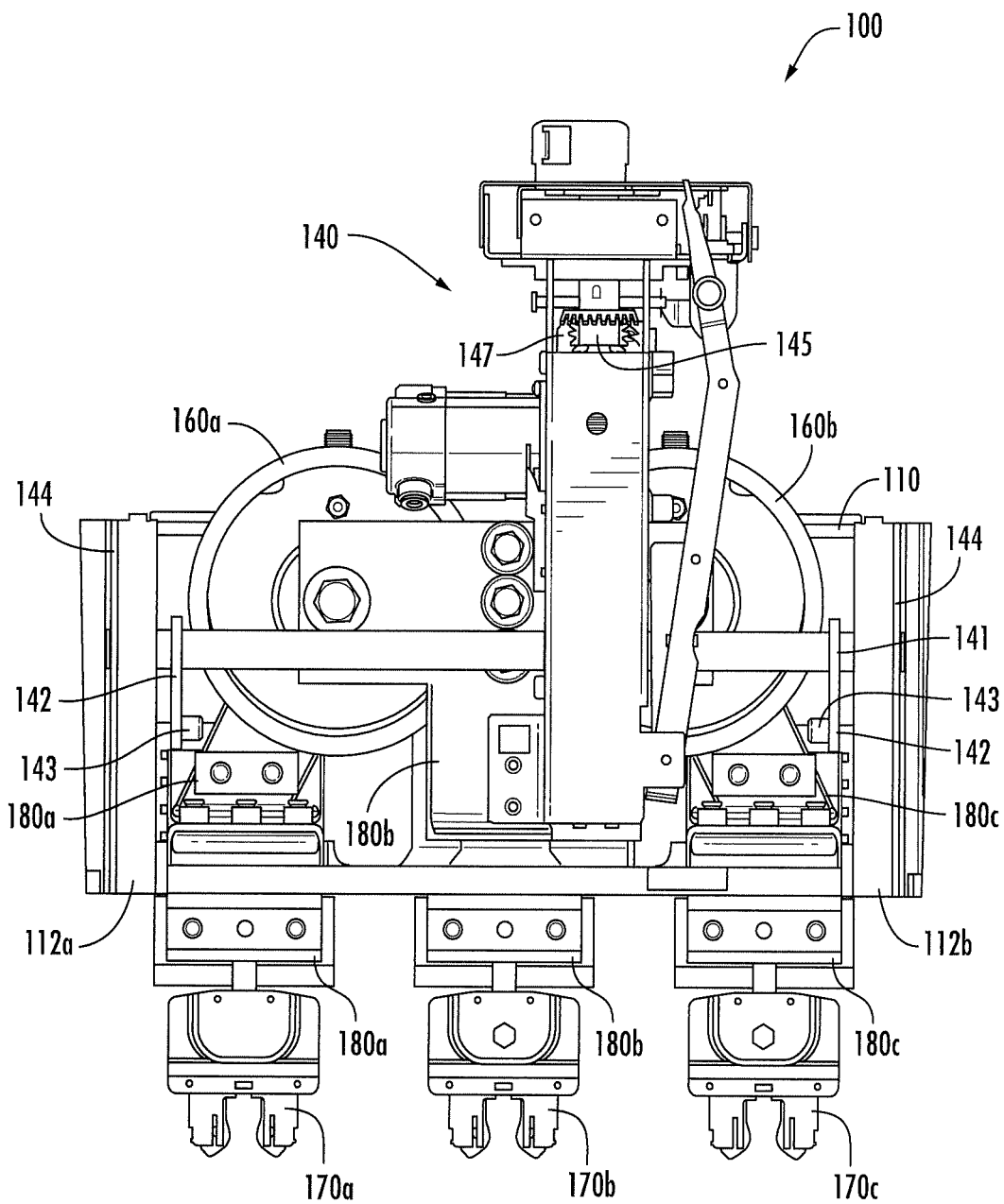
FIG. 7 is a bottom view of the AQD of FIG. 1 with an interior front cover removed.
Figure 8:
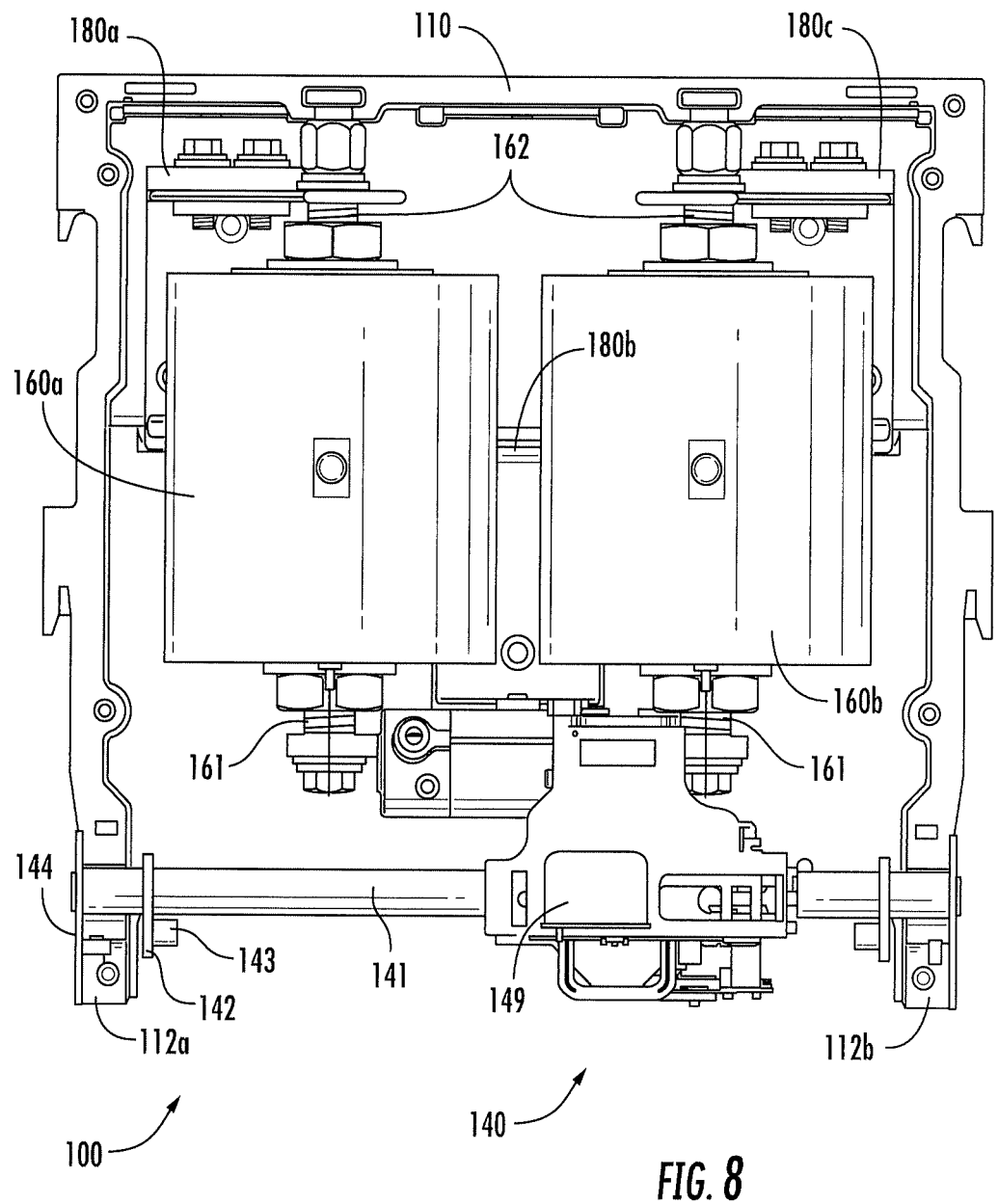
FIG. 8 is a front view of the AQD of FIG. 1 with an interior front cover removed.

Referring to FIGS. 6-8, a top terminal 172 of the first controlled-arcing device 160a is electrically connected to a first bus bar assembly 180a, which passes through an opening in a back wall of the frame 110 to connect with a first stab-type connector 170a. A second bus bar assembly 180b is coupled to bottom terminals 161 of the first and second controlled-arcing devices, and extends through the back wall of the frame 110 to connect with a second stab-type connector 170b. A third bus bar assembly 180c is coupled to a top terminal 162 of the second controlled-arcing device 160b and extends through the back wall of the frame 110 to connect with a third stab-type connector 170c. The connectors 170a, 170b, 170c may be configured to engage respective bus bars (e.g., a phase conductors) within an electrical equipment unit, such as the electrical equipment unit 10 of FIGS. 2 and 3. This conductor arrangement enables, for example, phase-to-phase shorting by the controlled-arcing devices 160a, 160b. The bus bar assemblies 180a, 180b, 180c also provide mechanical support for the controlled-arcing devices 160a, 160b.

Referring again to FIG. 5, the racking mechanism 140 is disposed below the controlled-arcing devices 160a, 160b. The racking mechanism 140 includes the axle 141, which is driven by a worm shaft 145. A gearbox 146 drives the worm shaft 145 via a bevel gear arrangement 147. The gearbox 146 is driven by an electric motor 148. The worm shaft 145 may also be manually driven using a tool that engages an end of the worm shaft 145. The end of the worm shaft 145 may be accessed from the front of the AQD 100 by opening a shutter 149 which, as shown in FIG. 1, is externally accessible when the front exterior cover 120 is in place.

Figure 9:
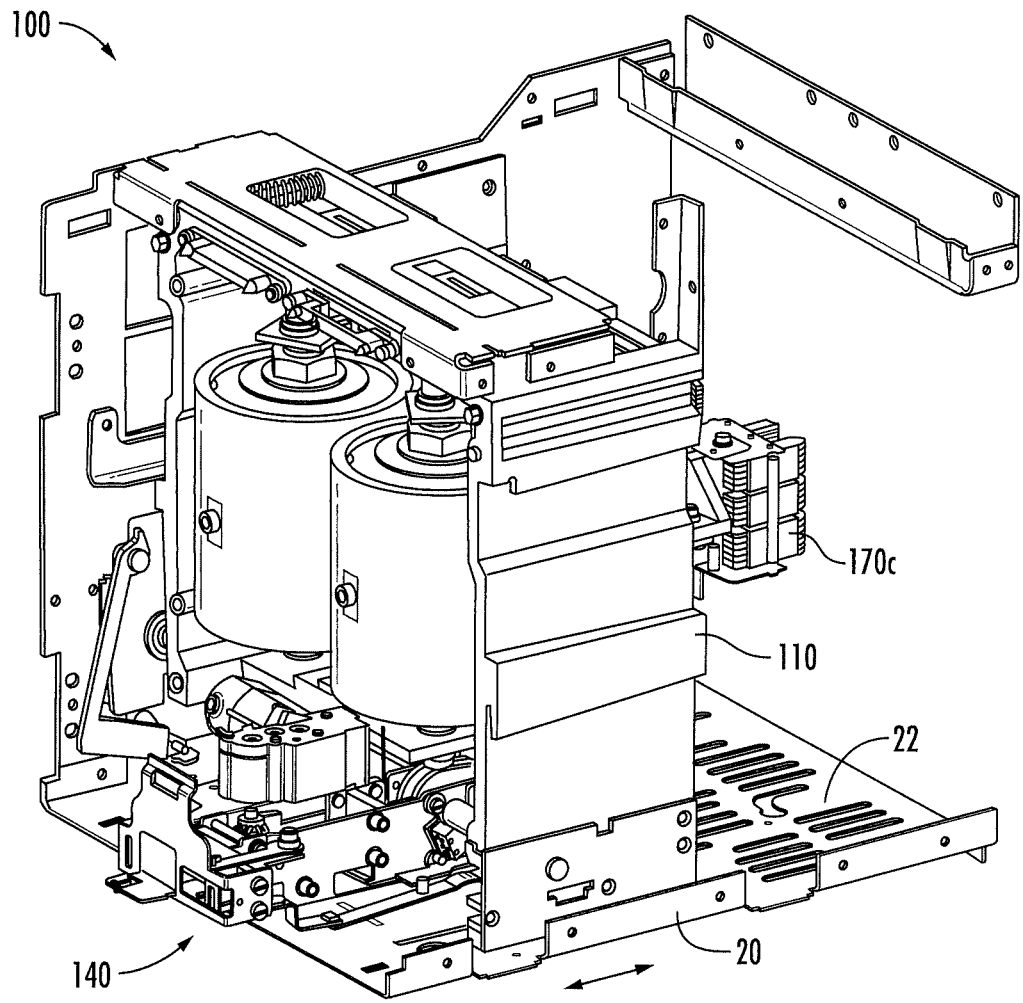
FIG. 9 is a cutaway perspective view of the AQD of FIG. 1 installed in an electrical equipment unit cassette.
Figure 10:
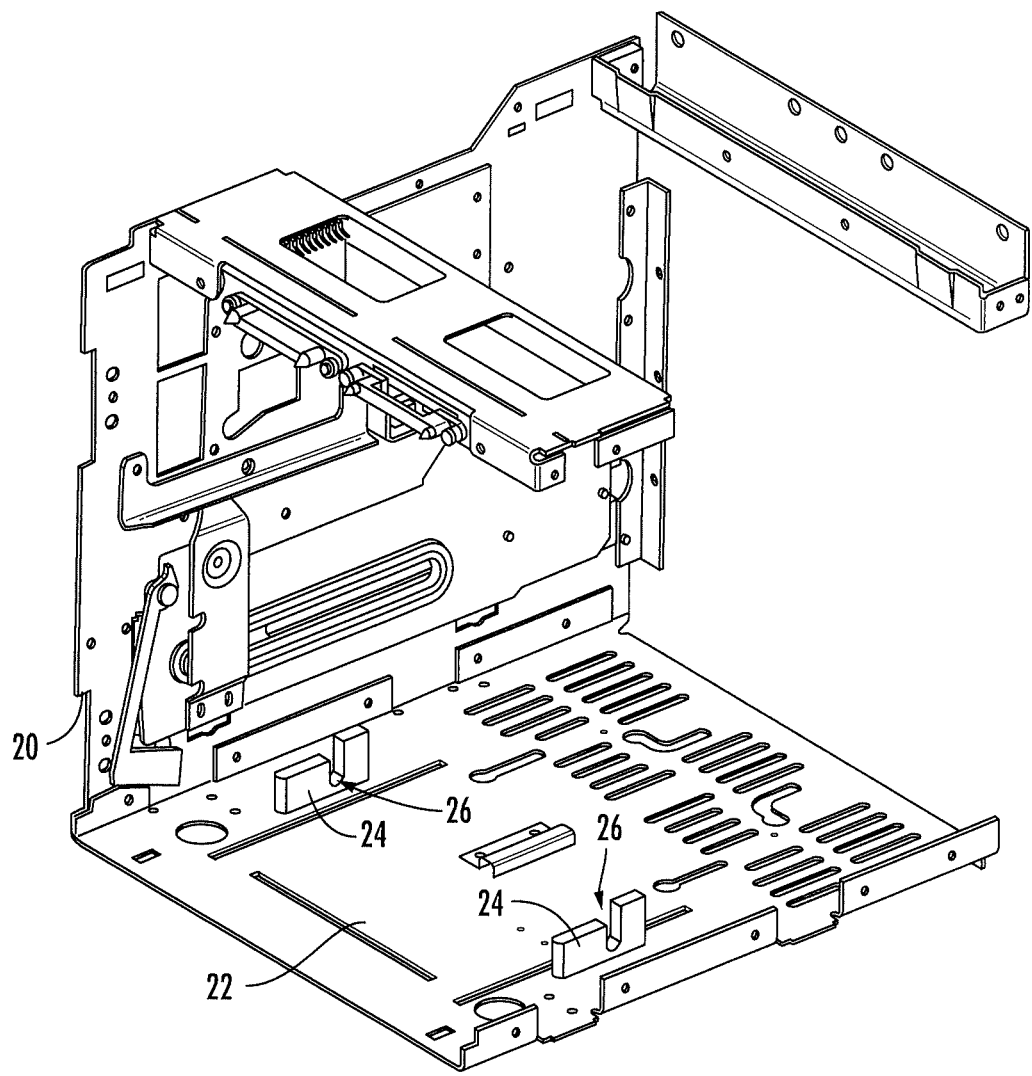
FIG. 10 is a cutaway perspective view of the cassette of FIG. 9.
Figure 11:
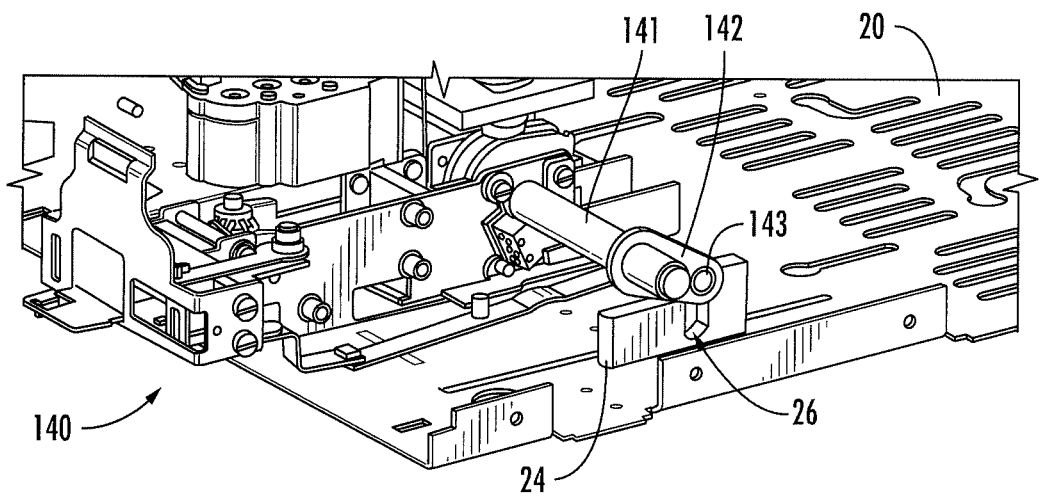
FIG. 11 is a detailed perspective view illustrating engagement of the AQD of FIG. 1 with notched tabs in the cassette of FIGS. 9 and 10.

FIGS. 9-11 illustrate interaction of the racking mechanism 140 of the AQD 100 with the cassette 20. Referring to FIG. 9, the frame 110 rests on a bottom wall 22 of the cassette 20. As shown in FIG. 10, tabs 24 extend upwardly from the bottom wall 22, and have notches 26 therein. As shown in FIG. 11, the pawls 143 on the arms 142 extending from the axle 141 are configured to engage the notches 26 in the tabs 24. As the axle 141 rotates, the arms 142 push against the tabs 24, causing the AQD 100 to slide in and out with respect to the cassette 20, such that the stab connectors 170a, 170b, 170c can engage and disengage from bus bars in the electrical equipment unit in which the AQD 100 is installed.

Figure 12:
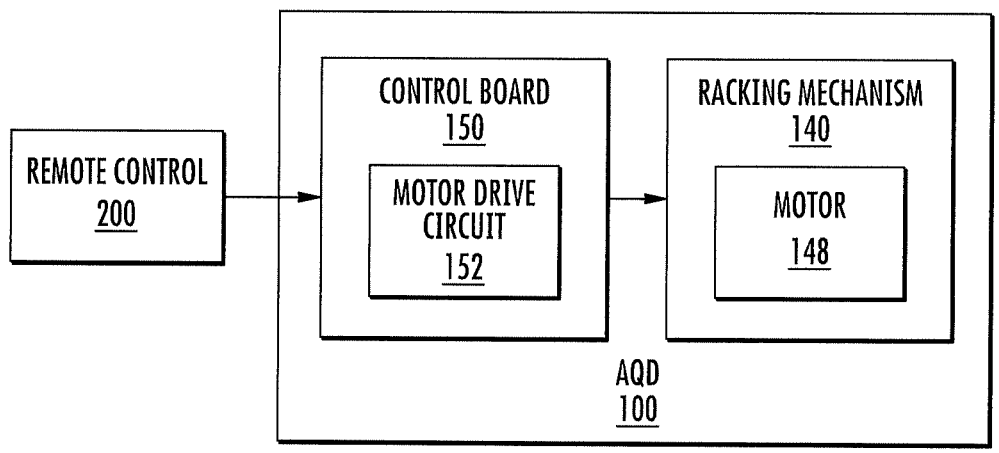
FIG. 12 is a schematic block diagram illustrating a control arrangement for the AQD of FIG. 1.

FIG. 12 illustrates an example of a control arrangement for the racking mechanism 140. The motor 148 of the racking mechanism 140 may be driven by a motor drive circuit 152, which may, for example, be included in the control board 150 shown in FIG. 4. The motor drive circuit 152 may be remotely controlled by a remote control device 200, enabling an operator to operate the racking mechanism 140 of the AQD 100 from a safe distance when racking the AQD 100 in and out of an electrical equipment unit. The control device 200 may be, for example, a wire and/or fiber linked pendant or other device connected to the motor drive circuit 152 via a cable sufficiently long to provide the desired physical separation. In some embodiments, the control device 200 may be a wireless remote control that communicates with the motor drive circuit 152 using, for example, an infrared, radio frequency (e.g., Bluetooth or WiFi) or other wireless interface. The control device 200 may also control other functions of the AQD 100, such as configuration and test controls. The control device 200 may also receive and display status and other information from the AQD 100.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An arc quenching device comprising:
   a frame;
   at least one controlled-arcing device supported by the frame;
   at least one contact assembly supported by the frame and electrically connected to the at least one controlled-arcing device; and
   a racking mechanism supported by the frame and comprising a motor and at least one actuator member driven by the motor and configured to engage a feature in an electrical equipment unit compartment to move the arc quenching device within the compartment and engage the at least one contact assembly with a bus of the electrical equipment unit.

2. The device of claim 1, wherein the arc quenching device is configured to be installed in a cassette in the electrical equipment unit and wherein the actuator member is configured to engage a feature of the cassette.

3. The device of claim 2:
   wherein the frame comprises first and second walls on respective first and second sides of the at least one controlled-arcing device;
   wherein the racking mechanism comprises:
      an axle extending between the first and second walls of the frame; and
      a motor drive unit comprising the motor and configured to rotate the axle; and
   wherein the at least one actuator member extends radially from the axle to engage the feature of the cassette.

4. The device of claim 3, wherein the at least one actuator member comprises:
   an arm extending radially from the axle; and
   a pawl at a distal end of the arm and configured to engage a notch in the cassette.

5. The device of claim 4:
   wherein the cassette comprises a tab extending from a wall of the cassette; and
   wherein the pawl is configured to engage a notch in the tab.

6. The device of claim 3, wherein the at least one member comprises:
   first and second arms extending radially from the axle and spaced apart along an axis of the axle; and
   first and second pawls at distal ends of respective ones of the first and second arms and configured to engage respective first and second notches in the cassette to cause movement between the frame and the cassette.

7. The device of claim 6:
   wherein the cassette comprises first and second tabs extending from a wall of the cassette; and
   wherein the first and second pawls are configured to engage respective first and second notches in the first and second tabs.

8. The device of claim 3, wherein the motor drive unit comprises:
   a worm shaft configured to rotate the axle; and
   a gear box configured to drive the worm shaft via a bevel gear,
   wherein the motor is configured to drive the gear box.

9. The device of claim 1, wherein the at least one controlled-arcing device comprises first and second vertically-oriented cylindrical controlled-arcing devices.

10. The device of claim 9, further comprising:
    a first bus bar connected to a top terminal of the first controlled-arcing device;
    a second bus bar interconnecting bottom terminals of the first and second controlled-arcing devices; and
    a third bus bar connected to a top terminal of the second controlled-arcing device; and
    wherein the at least one contact assembly comprises first, second and third stab connectors electrically connected to respective ones of the first, second and third bus bars.

11. The device of claim 1, further comprising a motor drive circuit supported by the frame, coupled to the motor and configured to be controlled by a wired or wireless remote control device.

12. An arc quenching device comprising:
    a frame configured to be inserted into a cassette in a compartment of an electrical equipment unit;
    at least one controlled-arcing device supported by the frame and disposed between first and second walls of the frame;
    at least one contact assembly electrically connected to the at least one controlled-arcing device;
    an axle extending between the first and second walls of the frame;
    an actuator member extending radially from the axle to engage a surface of the cassette; and
    a motor drive unit configured to rotate the axle to cause movement of the frame relative to the cassette.

13. The device of claim 12, wherein the actuator member comprises:
    an arm extending radially from the axle; and
    a pawl at a distal end of the arm and configured to engage a notch in a tab extending from a wall of the cassette.

14. The device of claim 12, wherein the actuator member comprises:
    first and second arms extending radially from the axle and spaced apart from one another along an axis of the axle; and
    first and second pawls at distal ends of respective ones of the first and second arms and configured to engage respective first and second notches in respective first and second tabs extending from a wall of the cassette.

15. The device of claim 12, wherein the motor drive unit comprises:
    a worm shaft configured to drive the axle;
    a gear box configured to drive the worm shaft via a bevel gear; and
    a motor configured to drive the gear box.

16. The device of claim 12, wherein the at least one controlled-arcing device comprises first and second vertically-oriented cylindrical controlled-arcing devices supported by the frame between the first and second walls, and wherein the device further comprises:
    a first bus bar connected to a top terminal of the first controlled-arcing device;
    a second bus bar interconnecting bottom terminals of the first and second controlled-arcing devices; and a third bus bar connected to a top terminal of the second controlled-arcing device; and wherein the at least one contact assembly comprises first, second and third stab connectors electrically connected to respective ones of the first, second and third bus bars.

17. The device of claim 12, further comprising a motor drive circuit supported by the frame, coupled to the motor drive unit and configured to be controlled by a wired or wireless remote control device.

\* \* \* \* \*